(12) United States Patent
Johannnesson et al.

(10) Patent No.: US 9,862,459 B2
(45) Date of Patent: Jan. 9, 2018

(54) AIR LUBRICATION SYSTEM AND VESSEL COMPRISING SUCH A SYSTEM

(71) Applicant: Silverstream Technologies B.V., Amstelveen (NL)

(72) Inventors: Johannes Johannnesson, Espergaerde (DK); Noah Silberschmidt, London (GB); Jorgen Clausen, Broendby (DK)

(73) Assignee: SILVERSTREAM TECHNOLOGIES B.V., Amstelveen (NL)

( * ) Notice: Subject to any disclaimer, the term of this patent is extended or adjusted under 35 U.S.C. 154(b) by 0 days.

(21) Appl. No.: 15/123,702

(22) PCT Filed: Mar. 4, 2015

(86) PCT No.: PCT/NL2015/050136
§ 371 (c)(1),
(2) Date: Sep. 6, 2016

(87) PCT Pub. No.: WO2015/133900
PCT Pub. Date: Sep. 11, 2015

(65) Prior Publication Data
US 2017/0015387 A1 Jan. 19, 2017

(30) Foreign Application Priority Data

Mar. 5, 2014 (EP) .................................. 14157871

(51) Int. Cl.
*B63B 1/38* (2006.01)
(52) U.S. Cl.
CPC .......... *B63B 1/38* (2013.01); *B63B 2001/387* (2013.01); *Y02T 70/122* (2013.01)

(58) Field of Classification Search
CPC ...................................................... B63B 1/38
See application file for complete search history.

(56) References Cited

U.S. PATENT DOCUMENTS 6,145,459 A  11/2000  Takahashi et al.
8,561,562 B2 10/2013  Takano et al.

FOREIGN PATENT DOCUMENTS

| JP | 2002-002582 A | 1/2002 |
| WO | 2010/058614 A1 | 5/2010 |
| WO | 2013/125951 A1 | 8/2013 |

OTHER PUBLICATIONS

International Search Report dated Apr. 22, 2015, in corresponding PCT application.

*Primary Examiner* — Stephen P Avila
(74) *Attorney, Agent, or Firm* — Young & Thompson

(57) ABSTRACT

A vessel (1) has at least three cavities that are distributed across the bottom in the length direction along a line extending from the center line near the bow, to a respective side. Furthermore, the vessel accommodates for each cavity or pair of cavities on opposite sides of the center line at a predetermined length position, a corresponding compressor for injecting air into the cavity at a pressure substantially corresponding to the hydrostatic pressure in each cavity. Each cavity (33) may include a deflector that has an elongate part (29, 34, 34') extending in the length direction of the cavity over at least at least 5%, preferably at least 10% of the cavity length L. An air inlet opening (23) may be provided in the top wall (19).

13 Claims, 6 Drawing Sheets

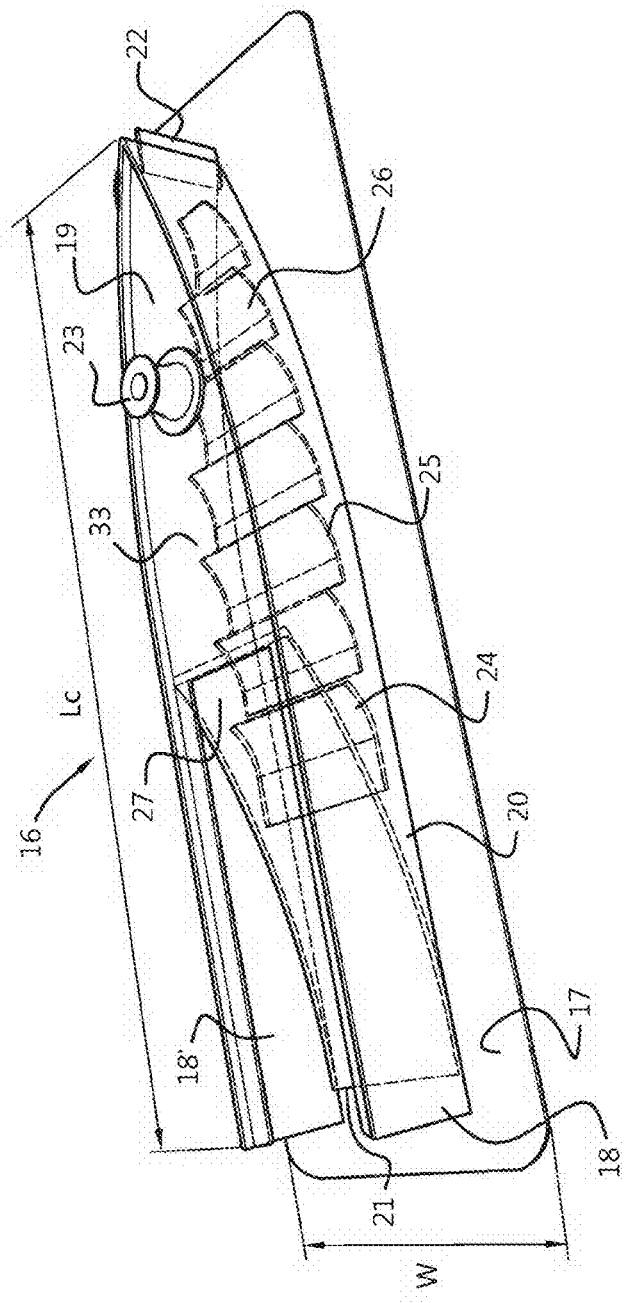
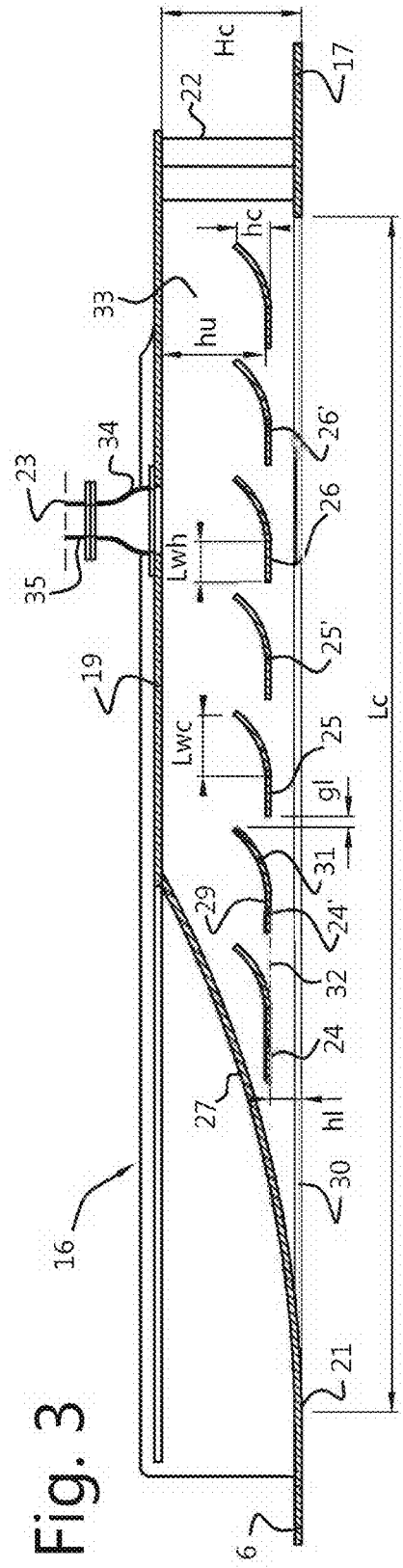
Fig. 2
Fig. 3

AIR LUBRICATION SYSTEM AND VESSEL COMPRISING SUCH A SYSTEM

FIELD OF THE INVENTION

The invention relates to a vessel comprising a hull having a center line, opposing sides and a substantially flat bottom, the vessel having a number of air lubricating systems, each system comprising sidewalls and a top wall defining a cavity with an opening situated in an interface plane that is transversely to the sidewalls, substantially at the level of the flat bottom, the opening having a front end and a rear end when seen in the length direction of the cavity, an air inlet spaced from the opening of the cavity, the cavity having a length, a distance of the top wall from the interface plane (Hc) and a width (W), wherein the ratio Lc/Hc is in the range of 7:1 to 13:1, the ratio W/H is in the range of 1.3:1 to 2.5:1 and the ratio Lc/W is in the range of 3.5 to 1 to 7:1.

BACKGROUND OF THE INVENTION

Such a system and vessel are known from WO 2013/125951, filed in the name of the applicant. In this publication it is described that efficient air lubrication of a flat bottom of a vessel is achieved by providing a relatively small-sized open cavity and injecting air into the cavity at about hydrostatic pressure, such that a substantially flat water-air interface is formed at the height of the bottom. At this interface, air is mixed into the water due to the Kelvin Helmholtz mixing effect, and a stream of air bubbles escapes from the rear of the cavity. Such cavities were found to provide a stable and efficient manner of providing a layer of bubbles along the bottom, reducing frictional drag such that the energy gain as a result of reduced friction during propulsion by far outweighs the extra energy required for injecting air at hydrostatic pressures into the cavity.

In order to facilitate emptying of the cavity during start up, a number of curved wave deflectors is described that extend transversely across the cavity. The wave deflectors reduce turbulence inside the cavity and cause air to be retained inside the cavity for a longer period of time such that compressors of reduced capacity for less powerful air injection during start up are required.

In WO 2013/125951 it has also been described that in addition to a frontmost cavity on the center line, two cavities may be situated on each side of the center line at different length positions for obtaining an even distribution of air bubbles across the bottom.

WO 2010/058614 also discloses a vessel having multiple air cavities, two cavities on each side of the center line at different length positions In U.S. Pat. No. 6,145,459 an air lubrication system is described in which air is injected along the hull at an angle towards the stern via a slit connected to a cavity containing compressed air on the inside surface of the hull. A wire is placed upstream of the exit point of the slit in the hull to cause turbulence that breaks up the air volume hence forming small bubbles. The known system has as a disadvantage that air injection requires relatively high pressures and is relatively inefficient in view of the power required for lubrication versus reduction in frictional drag. Furthermore, the wire on the outside of the hull is relatively vulnerable, produces additional drag and may form a point of attachment for dirt, shellfish or seaweed.

JP 2002-2582 A describes an air cavity vessel having a cavity and having a special upstream wedge projecting below bottom level for creating an under pressure inside the cavity. Air is supplied to the cavity without the need for a compressor in view of the created under pressure. Inside the cavity, a lower front part results in an uneven and turbulent air-water interface causing mixing of water and air. Small-size bubbles having a relatively low internal pressure exit at the rear of the cavity, the bubble size decreasing due the water pressure when the bubbles travel along the bottom of the hull. The known lubrication system is relatively inefficient as it operates at non-controlled under-pressures created inside the cavity, and fails to form a flat air-water interface that is level with the flat bottom, allowing mixing of air and water by the Kelvin Helmholtz effect along said whole interface and unrestricted exit from the cavity along the interface onto the bottom in a well-defined and undisturbed boundary layer.

It is therefore an object of the present invention to provide an improved distribution of air along the bottom for increased lubrication.

Furthermore, the invention strives to provide improved control and safety of the air lubrication system.

It is another object of the invention to provide an air lubrication system having improved airflow characteristics.

SUMMARY OF THE INVENTION

Hereto a system according to the invention is characterised in that on each side of the center line of the vessel at least three cavities are distributed across the bottom in the length direction along a line extending from the center line near the bow, to a respective side.

With this "V-shaped" cavity distribution, an even blanket of air bubbles can be spread across the entire width of the bottom. The line along which the cavities are situated may be straight or curved, or may be comprised of segments of different curvature. The inventors have found that utilizing a larger number of small sized cavities results in a favorable air bubble distribution generated at relatively low energy input.

According to a further embodiment, the cavities may be arranged in such a manner that the rear end of a cavity closest to the bow, is positioned further from the bow than the front end the adjacent cavity seen in the direction towards the bow.

For a vessel with a sharp bow and an accordingly shaped flat bottom, the cavities are following the hull shape for an optimal distribution of air lubrication across the width of the bottom. The fanning-out distribution of cavities results in improved strength of the bottom compared to the case in which the cavities are aligned in the length direction of the vessel.

For effective distribution of air bubbles across the hull, in the region near the bow, the two front most cavities may be situated at a predetermined distance from the center line, two additional cavities closer to the bow being situated at a smaller distance from the center line. The central cavities, included inside the bounds of the V-shaped distribution, provide additional air lubrication along the center line of the vessel.

The cavities that are evenly spread in the transverse direction provide a good distribution of air lubrication along the flat bottom. The closely spaced cavities near the center line are tailored to the spread of the flow lines in the centre and were found to depend in position on the stability of the water after the encounter with the front of the vessel. The inventors have surprisingly found the central location of the closely spaced cavities after extensive CFD analysis.

Wave deflectors may be employed according to the invention to stabilize the flow inside the cavity. By providing a wave deflector inside the cavity with a relatively long dimension in the cavity length direction, the cavity can be filled with air effectively while the vessel is sailing, e.g. at a speed of 20 knots. In operation, the deflector effectively shields the air-filled cavity from water entry due to waves and roll motions of the vessel, the elongate deflector part keeping the water surface inside the cavity stable during roll motions, such that a stable operation of the cavity is warranted. Also in case the vessel sails without air inside the cavity, the elongate deflector part according to the invention results in an undisturbed water flow at reduced drag.

As used herein, the wording "substantially flat bottom" is intended to mean a bottom extending in a plane that may be at an angle of between +5° and −5° to the horizontal.

The deflector according to the invention may be formed by one or more perforated plate members, or may be in the form of a lattice or framework structure. The deflector may comprise a number of deflector members, each having a horizontally oriented part, wherein a spacing in the length direction of the cavity between adjacent elongate parts is between 1% and 10% of the cavity length L.

During operation, air can pass in a uniformly distributed manner between the deflectors downwards to the Kelvin Helmholtz interface at the level of the bottom of the hull. By leaving relatively narrow strips of open area between adjacent deflectors, the deflector effectively shields the cavity from wave entry and from water entry during roll motions while air can freely travel to the Kelvin Helmholtz interface.

The speeds and airflows at which an effective Kelvin Helmholtz effect takes place are given in WO 2013/125951 on page 4 line 40-page 5 line 5, which are incorporated herein by reference. The bubbles formed by the air lubrication system according to the invention range in size from 0.5 mm to 5 mm. At lower speeds, it appeard that the bubbles formed had a size within the higher end of the range and typically measured between 3 mm and 5 mm in diameter. For higher speeds, the bubble size was found to be at the lower end of the range and to be between 0.5 mm and about 3 mm.

The vessels in which the cavities of the invention can be used may be smaller sized vessel for inland use, but are preferably oceangoing vessels, and may have a flat bottom with a length of at least 20 m up to a length of 500 m. The water displacement of the vessels suitable for use with the air lubrication system according to the invention may be 10.000 tons or more, preferably 50.000 ton or more and may comprise large ocean going tankers, bulk carriers, container ships or other cargo vessels, as well as ferries, cruise ships and other passenger ships.

The length of the cavity may between 2 m and 10 m, and the height of the cavity may be between 0.2 m and 1.5 m. The width of the cavity may range between 40 cm and 2 m. It was found that the above dimensions of the cavities is sufficient to create a stable Kelvin Helmholtz Interface effect for constant air bubble generation and flow of these bubbles into the boundary layer along the bottom.

The size of the cavity determines both the volume of air required for the generation of a stable layer of lubricating air bubbles, and determines the volume of air required for refilling the cavity after collapse and refilling with water. Hence, optimizing the cavity size determines the overall effectiveness of the air lubrication system and the efficiency of the total air supply and is decisive for overall energy efficiency of the system. This energy efficiency results in reduced fuel usage of the vessel and provides a high economic benefit.

The cavity may be rectangular in shape, but is preferably dagger-shaped or bullet-shaped at its front part for improved stability of the air-water interface.

It was found that the dagger- and bullet-shaped cavities reduced the wave formation on the free water surface. In this manner, the air-filled cavity was found to show improved stability compared to a cavity having a rectangular shape that will more quickly collapse.

The deflectors may comprise a horizontal section extending at least 10 cm, preferably at least 15 cm in the length direction of the cavity substantially parallel to the interface plane, and a curved transverse section curving upward, extending at least 10 cm in the length direction and at least 5 cm, preferably at least 10 cm upward from the height of the horizontal deflector section, wherein a distance between the adjacent deflector members in the length direction of the cavity is no larger than 1 m, preferably no larger than 30 cm, most preferably no larger than 10 cm.

The upwardly curved parts of the wave deflectors deflect during sailing when the cavity is filled with air, upwardly directed waves in a downward direction. At least three deflector members may be provided in the cavity, the horizontal deflector parts being situated in a deflector plane substantially parallel to the interface plane. Preferably the deflector plane is covering a substantial part of the cavity, such as at least 25% of the surface area of the interface plane, preferably at least 50%, more preferably at least 75%. In this way the cavity is effectively shielded from wave entry and the stability of the air-filled cavity is improved.

In another embodiment, the deflector plane is situated at a distance of at least 3 cm from the interface plane. By providing the deflector plane relatively close to the air-water interface, the upward movement of this interface, for instance during roll motion, is reduced and the stability of the air filled cavity is improved. Preferably, at a rear end of the cavity a rear cavity wall is sloping from the top wall to the interface plane when going in a rearward direction, at least one deflector element being situated below the sloping rear cavity wall.

Preferably an air supply opening is placed in the top wall for connection to a compressor outlet duct. The air that is injected into the cavity via the top wall, divides itself evenly from the top across the cavity and flows downwards along the deflectors to form a stable air-water interface. By providing the air inlet in the top wall of the cavity, the air flow at the front end remains relatively undisturbed and an optimal air-mixing Kelvin Helmholtz interface is formed. This is especially advantageous in case a bullet- or dagger-shaped cavity is employed.

For proper control of the airflow from each cavity, and with a view to providing a redundant system in case of failure, an embodiment of a vessel according to the invention comprises for each cavity or pair of cavities on opposite sides of the center line at a predetermined length position, a corresponding compressor for injecting air into the cavity at a pressure substantially corresponding to the hydrostatic pressure in each cavity. By providing a compressor for each cavity or cavity pair, the air flow into each cavity can be effectively controlled by setting the output of the compressor. This is far more energy-efficient than providing a single compressor and controlling the airflow to each cavity via a respective valve. Also retrofitting an existing vessel with air cavities is facilitated by the use of an individual compressor for each cavity instead of using a single bulky compressor.

Finally, the use of a plurality of smaller sized compressors is favourable from a cost perspective over the use of a single large compressor.

The vessel may comprise near its bow a support deck, situated below an upper deck level, the compressors being situated on the support deck.

The air inlet opening in the top wall of the cavity may comprise a section with a relatively wide diameter that gradually tapers into a duct section of smaller diameter. The diameter of the air inlet opening may lie between 15 and 40 cm.

The widened air inlet was found to be effective for reducing the air speed at the inlet resulting in an undisturbed Kelvin Helmholtz interface and consequent optimal water-air mixing.

BRIEF DESCRIPTION OF THE DRAWINGS

Some embodiments of an air lubrication system according to the invention and a vessel comprising such a system will, by way of non-limiting example, be described in detail with reference to the accompanying drawings. In the drawings:

FIG. 2 shows a perspective view of an air lubrication system according to the invention, FIG. 3 shows a cross-sectional view of the system of FIG. 2.

DETAILED DESCRIPTION OF THE INVENTION

Figure 1:
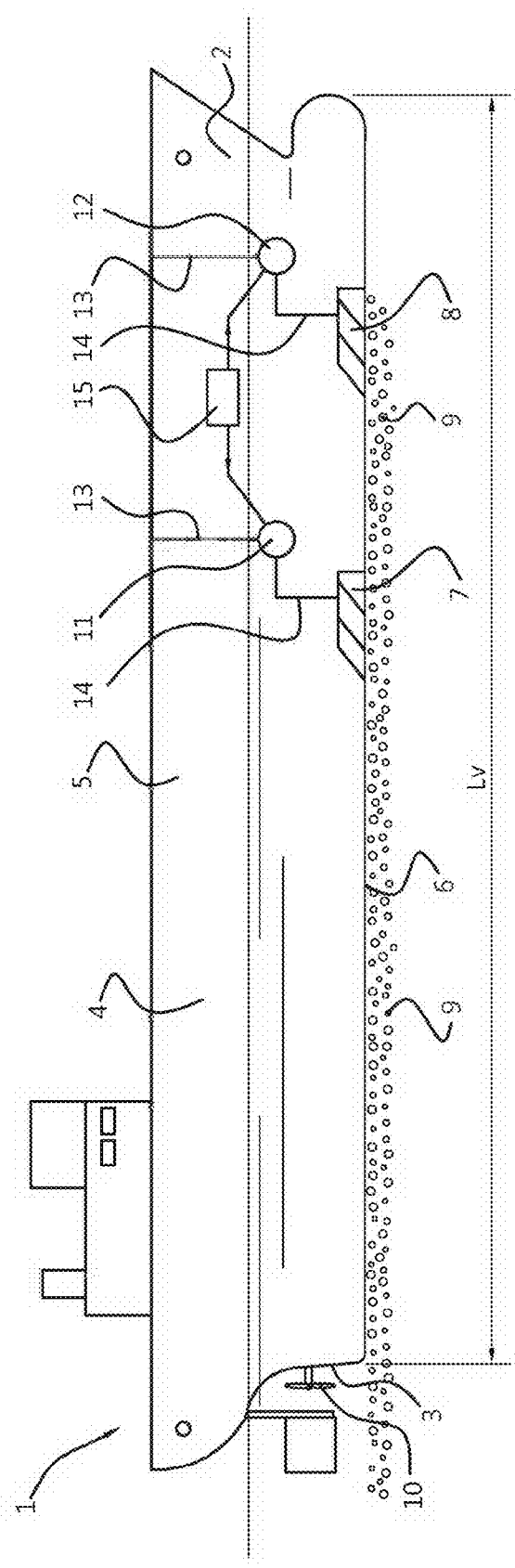
FIG. 1 shows a schematic side view of a vessel comprising an air lubrication system according to the invention.

FIG. 1 shows a vessel 1 having a length Lv of between 20 m and 500 m, and a width between 5 m and 75 m. The vessel 1 may have a water displacement of at least 10000 ton, preferably at least 50000 ton and is an ocean going vessel. The vessel 1 has a hull 4 with a bow 2, a stern 3, sides 5 a substantially flat bottom 6 and a propeller 10. Air lubricating cavities 7,8 that are open in the plane of the bottom 6, are distributed along the bottom 6 to generate a layer of bubbles 9 travelling towards the stern 3, along the flat bottom 6. Compressors 11,12 are connected to each cavity 7,8 for supplying air at the hydrostatic pressure inside each cavity at the prevailing draught level of the vessel. The compressors 11,12 are with an air outlet duct 14 connected to the cavities 7,8 and have an air inlet duct 13 for taking in ambient air. The compressors 11,12 are controlled by a controller 15, for regulating the air supply in dependence of the sailing speed, sea state and during starting and stopping.

The inventors have found out that the following key principles apply for proper design of the air lubrication system of FIG. 1:

FIG. 2 shows an air lubrication system 16 that is constructed as an integral module forming a cavity 33 that can be fitted into the bottom 6 of the hull 4 of a vessel 1. The system 16 comprises sidewalls 18, 18' and a top wall 19. The sidewalls 18,18' are supported on a flange 17 that can be welded into the flat bottom 6 of the vessel 1. The sidewalls 18,18' delimit an opening 20 that is substantially level with the flat bottom surface of the vessel, the opening 20 forming a smooth air-water interface plane in which air is mixed into the water due to the Kelvin Helmholtz mixing effect. Air bubbles that are mixed with the water at the interface plane leave the cavity along rear edge 21 to pass in a smooth transition from the cavity onto the bottom and to travel unrestricted along the flat bottom 6 in the direction of the stern 3. A concavely curved, downwardly sloping wall part 27 connects the top wall 19 with the rear edge 21 to guide the air and water inside the cavity in a smooth flow pattern to the exit point situated along lower rear edge 21.

The front end 22 of the cavity 33 is dagger-shaped and an air inlet 23 is situated in the top wall 19. The air inlet 19 can be connected to one of the air outlet ducts 14 of the compressors 11,12.

Inside the cavity 33, a number of curved wave deflectors 24,25, 26 extends across the width W of the cavity and are connected to the sidewalls 18, 18'. The length Lc of the cavity 33 may be about 4 m, the width W being about 75 cm, and the height Hc being about 45 cm. The sidewalls 18,18' may have a thickness of 16 mm, whereas the flange 17 and top wall 19 may have a thickness of 20 mm.

The inventors have discovered that the following key principles apply for proper air lubrication system design:

The wave deflectors inside the cavity stabilize the water flow inside the cavity. This is important for two reasons: Firstly the deflectors enable filling the cavity with air during speed of the vessel. Secondly, the deflectors minimize resistance of the cavity while the system is off (without air input).

The wave deflectors are to be positioned above the interface plane of the cavity for obtaining an undisturbed flow of water pass the cavity during speed of the vessel. When the cavity is full of air, the deflectors are free of the water surface. They also help maintaining the surface of the water stable during roll motions of the vessel.

The slope at the rear wall of the cavity helps smooth release of the air bubbles into the boundary layer of the vessel and is designed to help to inject the bubbles that are formed by Kelvin Helmholtz mixing into the immediate vessel surface boundary layer, minimizing vertical dispersion and optimizing drag reduction.

The shape of the front of the cavity, i.e. wedge-shaped or bullet-shaped, controls water flow and minimizes wave instability at the air/water interface and improves consistent air mixing into the boundary layer by the Kelvin Helmholtz effect.

The length of the cavity is to be chosen sufficient to create a stable Kelvin Helmholtz air mixing effect for constant air bubble generation and flow of air bubbles into the boundary layer.

The relative positioning of the cavities under the hull is important to maximize the air-lubricated surface area of the hull.

The size of the cavity determines both the volume of air required for stable air bubble generation and required for recovery of the cavity after air pocket collapse. Optimizing the size of the cavity determines the overall lubrication effectiveness and the efficiency of the total air generation.

As is clear from FIG. 3, the wave deflectors 24,24';-26,26' each have a horizontal part 29 extending at a distance h1 of about 5 cm from the open interface plane 30 in which the boundary layer between air inside the cavity 16 and the water flowing along the flat bottom 6 is situated. The wave deflector horizontal part 29 has a length Lwh of about 20 cm, and the wave deflector curved part 31 having a length Lwc of about 20 cm. The distance hu of the horizontal wave deflector parts 29 from the top wall 19 is about 30 cm. The horizontal parts 29 of all wave deflectors lie at substantially the same height in a deflector plane 32. The height hc of the curved deflector part is about 11 cm.

The distance g1 between adjacent wave deflectors 24, 24' is about 5 cm. The projected surface area of the wave deflectors 24-26; on the interface plane 30 covers at least 25%, preferably at least 50%, most preferably at least 75% of the surface area of the interface plane.

The air inlet 23 is provided with a relatively wide section 34 connecting to a smaller diameter compressor outlet duct 35 which wide section reduces the air speed and provides a gradual inflow of air into the cavity 3.

Figure 4:
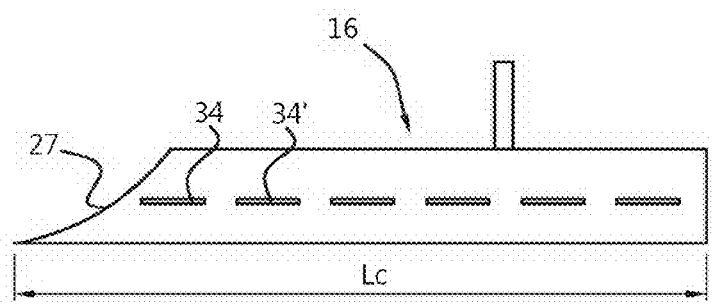
FIG. 4 shows a schematic side view of a cavity with an elongate deflector according to the invention.

FIG. 4 shows a schematic rendering of an air lubrication system 16 comprising a number of substantially horizontal deflector members 34, 34'. The deflector members 34,34' may be separate strips supported across the width of the cavity, or may be part of a unitary deflector 28 of a type as schematically shown in FIGS. 5a-5c.

Figure 5A:
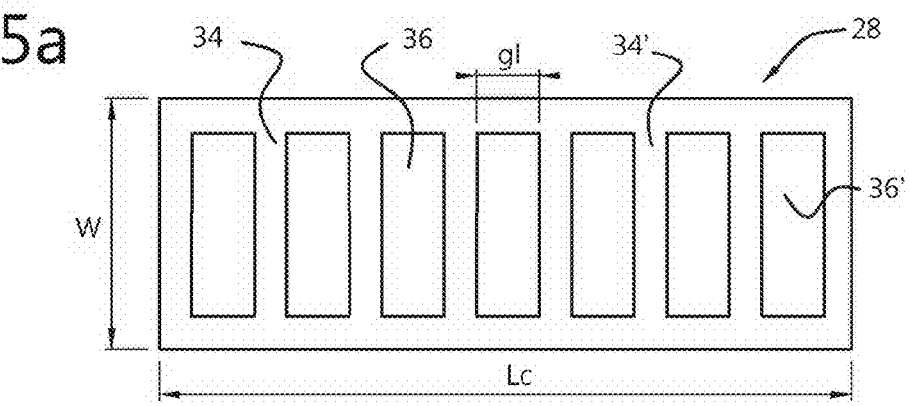
FIGS. 5a-5c show different embodiments of a deflector according to the invention.

In the embodiment of FIG. 5a, the deflector 28 comprises a plate-shaped body with a number of slits 36,36'. The elongate deflector parts 34, 34' are part of a unitary plate-shaped deflector 28.

Figure 5B:
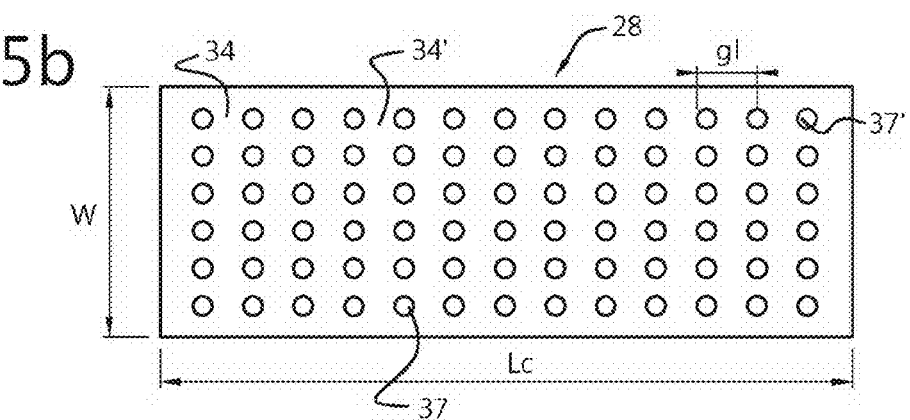

In the embodiment of FIG. 5b, the deflector 28 is in the form of a perforated plate. The holes 37,37' define elongate deflector parts 34, 34'.

Figure 5C:
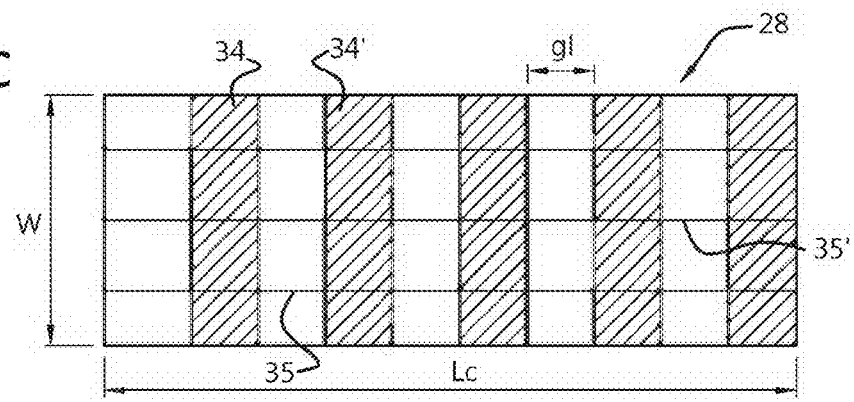

In the embodiment of FIG. 5c, the deflector 28 is lattice or framework shaped, wherein the elongate deflector members 34, 34' are interconnected by transverse girders 35,35'.

Figure 6:
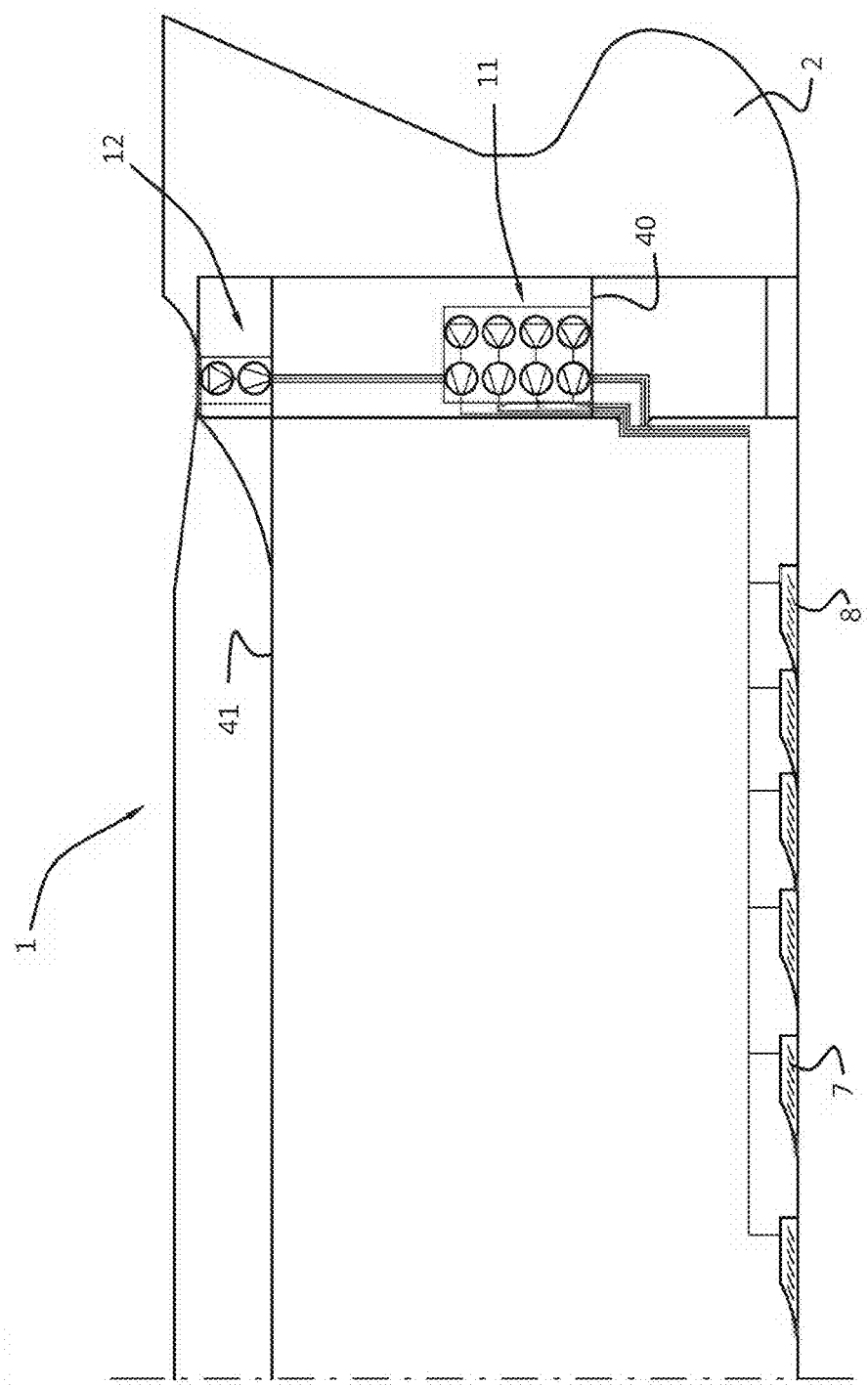
FIG. 6 shows a partly cut-away view of a vessel comprising for each cavity a respective compressor situated on a support deck near the bow.

As can be seen in FIG. 6, a number of compressors 11 is supported on a compressor supporting deck 40 near the bow 2 of the vessel 1. Other compressors 12 are situated near the bow 2 at the level of upper deck 41. One compressor 11,12 is provided for each cavity 7,8.

Figure 7:
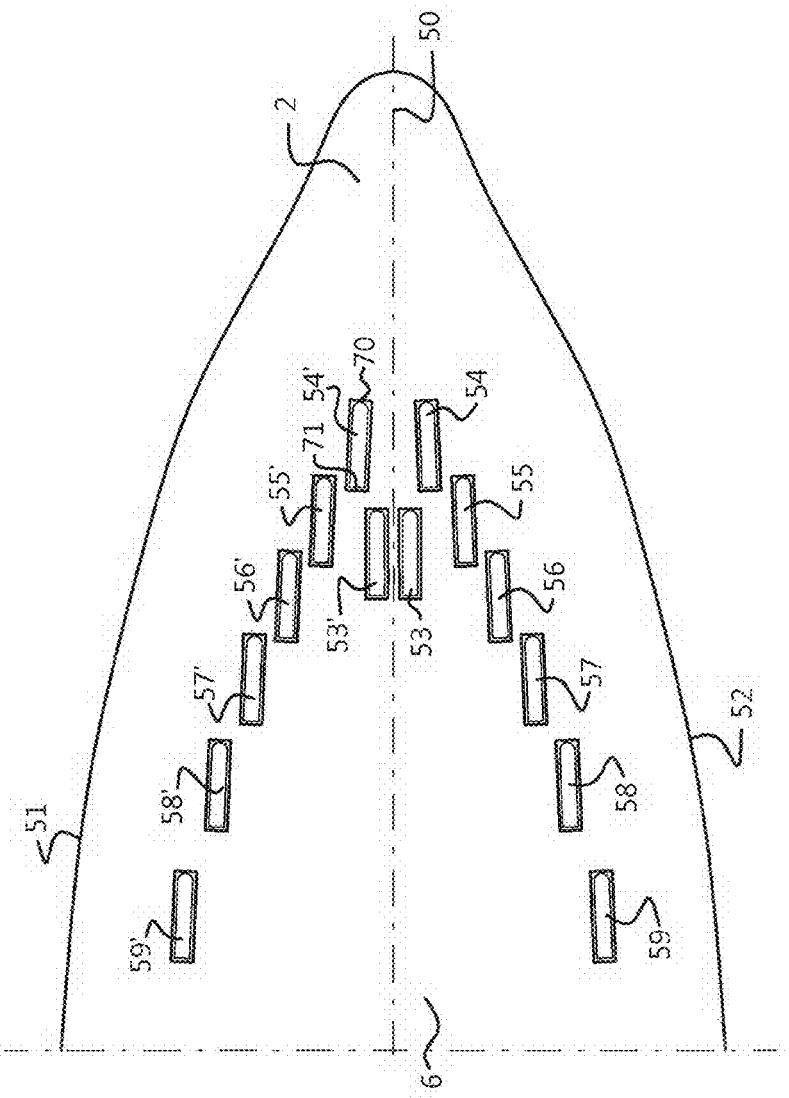
FIG. 7 shows a number of cavities near the bow in a V-shaped configuration.

In FIG. 7 it is shown that a number of cavities 54,54'-59, 59' is distributed along lines running from the center line 50 to the sides 51, 52 when going in a rearward direction. Two central cavities 53,53' are provided in proximity to the center line 50. The center line of the cavities 54-59' is at a slight angle with respect to the centreline 50. For cavities 54,55,56 and 57 and 54', 55', 56' and 57' the front part 70 is located closer to the bow 2 than the rear part 71 of the cavity ahead. This 'overlap' provides an even distribution of air bubbles across the flat bottom 6.

Figure 8:
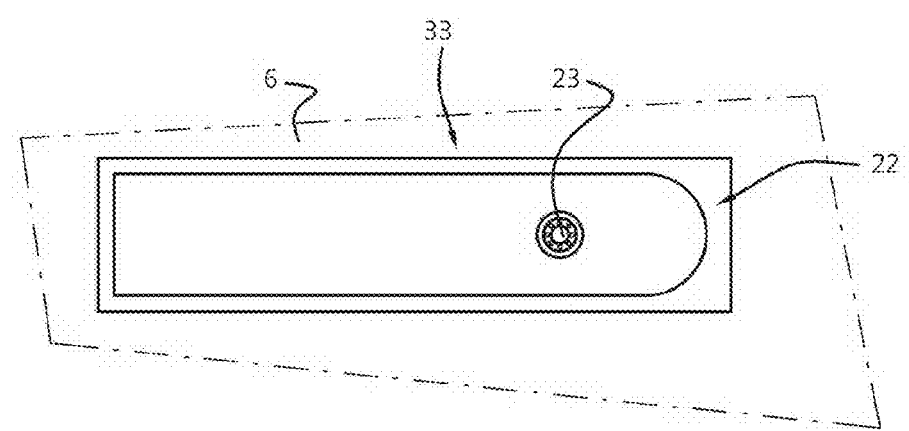
FIG. 8 shows an embodiment of a bullet-shaped cavity with a rounded front part.

As can be seen in FIG. 8, the cavity 33 has at its front end 22 a rounded head, such as to be bullet-shaped. It was found that both the rounded bullet-shaped front end 22 as well as the dagger-shaped front end result in the formation of a stable air-water interface inside the cavity 33 without wave formation along the interface plane.

The invention claimed is:

1. A vessel (1) comprising a hull (4) having a center line (50), opposing sides (51,52), a sharp bow (2) and an accordingly shaped substantially flat bottom (6), the vessel having a number of air lubricating systems (7,8), each air lubricating system comprising sidewalls (18,18') and a top wall (19) defining a cavity (33) with an opening (20) situated in an interface plane (30) that is transversely to the sidewalls, substantially at the level of the flat bottom, the opening having a front end (22) and a rear end (21) when seen in the length direction of the cavity, an air inlet (23) spaced from the opening of the cavity, the cavity having a length (Lc), a distance of the top wall (19) from the interface plane (30) (Hc) and a width (W), wherein the ratio Lc/Hc is in the range of 7:1 to 13:1, the ratio W/H is in the range of 1.3:1 to 2.5:1 and the ratio Lc/W is in the range of 3.5 to 1 to 7:1, wherein the length (Lc) of the cavity and of the interface plane is between 2 m and 10 m, the distance of the top wall (19) from the interface plane (30) being between 0.2 m and 1.5 m, a width (W) of the cavity and of the interface plane being between 0.4 m and 2 m, and wherein on each side of the center line (50) of the vessel (1) at least three cavities (54,54'-59,59') that include two first cavities (54, 54'), two second cavities (55, 55'), and two third cavities (56, 56') are distributed across the bottom in the length direction along a line extending from the center line (50) near the bow (2), to a respective side (51,52) such that the at least three cavities are following the hull shape near the sharp bow with a center line at a slight angle with respect to the center line (50), a rear part of the foremost two first cavities (54,54') being situated closer to the sharp bow (2), when seen along the center line (50) than a front part of the two third cavities (56, 56').

2. The vessel (1) according to claim 1, wherein the rear end (71) of the foremost two first cavities (54, 54') being situated closer to the sharp bow (2) is positioned further from the sharp bow than the front end of the adjacent two second cavities (55, 55') seen in the direction towards the stern (3).

3. A vessel (1) comprising a hull (4) having a center line (50), opposing sides (51,52) and a substantially flat bottom (6), the vessel having a number of air lubricating systems (7,8), each system comprising sidewalls (18,18') and a top wall (19) defining a cavity (33) with an opening (20) situated in an interface plane (30) that is transversely to the sidewalls, substantially at the level of the flat bottom, the opening having a front end (22) and a rear end (21) when seen in the length direction of the cavity, an air inlet (23) spaced from the opening of the cavity, the cavity having a length (Lc), a distance of the top wall (19) from the interface plane (30) (Hc) and a width (W), wherein the ratio Lc/Hc is in the range of 7:1 to 13:1, the ratio W/H is in the range of 1.3:1 to 2.5:1 and the ratio Lc/W is in the range of 3.5 to 1 to 7:1, wherein on each side of the center line (50) of the vessel (1) at least three cavities (54,54'-59,59') are distributed across the bottom in the length direction along a line extending from the center line (50) near the bow (2), to a respective side (51,52), and wherein in the region near the bow (2), the two front most cavities (54,54') are situated at a predetermined distance from the center line (5), two additional cavities (53,53') further towards the stern (3) being situated at a smaller distance from the center line (50).

4. A vessel (1) comprising a hull (4) having a center line (50), opposing sides (51,52) and a substantially flat bottom (6), the vessel having a number of air lubricating systems (7,8), each system comprising sidewalls (18,18') and a top wall (19) defining a cavity (33) with an opening (20) situated in an interface plane (30) that is transversely to the sidewalls, substantially at the level of the flat bottom, the opening having a front end (22) and a rear end (21) when seen in the length direction of the cavity, an air inlet (23) spaced from the opening of the cavity, the cavity having a length (Lc), a distance of the top wall (19) from the interface plane (30) (Hc) and a width (W), wherein the ratio Lc/Hc is in the range of 7:1 to 13:1, the ratio W/H is in the range of 1.3:1 to 2.5:1 and the ratio Lc/W is in the range of 3.5 to 1 to 7:1, wherein on each side of the center line (50) of the vessel (1) at least three cavities (54,54'-59,59') are distributed across the bottom in the length direction along a line extending from the center line (50) near the bow (2), to a respective side (51,52), and comprising for each cavity (7,8)

a corresponding compressor (11,12) for injecting air into the cavity at a pressure substantially corresponding to the hydrostatic pressure in each cavity.

5. The vessel according to claim 1, accommodating for each pair of cavities on opposite sides of the center line at a predetermined length position, a corresponding compressor (11,12) for injecting air into the cavity pair at a pressure substantially corresponding to the hydrostatic pressure in each cavity.

6. The vessel (1) according to claim 1, wherein in the region near the bow (2), the foremost two first cavities (54,54') are situated at a predetermined distance from the center line (5), two additional cavities (53,53') further towards the stern (3) being situated at a smaller distance from the center line (50).

7. The vessel (1) according to claim 2, wherein in the region near the bow (2), the foremost two first cavities (54,54') are situated at a predetermined distance from the center line (5), two additional cavities (53,53') further towards the stern (3) being situated at a smaller distance from the center line (50).

8. The vessel (1) according to claim 1, comprising for each cavity (7,8) a corresponding compressor (11,12) for injecting air into the cavity at a pressure substantially corresponding to the hydrostatic pressure in each cavity.

9. The vessel (1) according to claim 2, comprising for each cavity (7,8) a corresponding compressor (11,12) for injecting air into the cavity at a pressure substantially corresponding to the hydrostatic pressure in each cavity.

10. The vessel (1) according to claim 3, comprising for each cavity (7,8) a corresponding compressor (11,12) for injecting air into the cavity at a pressure substantially corresponding to the hydrostatic pressure in each cavity.

11. The vessel according to claim 6, accommodating for each pair of cavities on opposite sides of the center line at a predetermined length position, a corresponding compressor (11,12) for injecting air into the cavity pair at a pressure substantially corresponding to the hydrostatic pressure in each cavity.

12. The vessel according to claim 2, accommodating for each pair of cavities on opposite sides of the center line at a predetermined length position, a corresponding compressor (11,12) for injecting air into the cavity pair at a pressure substantially corresponding to the hydrostatic pressure in each cavity.

13. The vessel according to claim 3, accommodating for each pair of cavities on opposite sides of the center line at a predetermined length position, a corresponding compressor (11,12) for injecting air into the cavity pair at a pressure substantially corresponding to the hydrostatic pressure in each cavity.

* * * * *